June 11, 1929.  W. E. TAYLOR  1,716,671
AGITATED SOLDER BATH
Filed March 17, 1926  3 Sheets-Sheet 1

INVENTOR.
William E. Taylor
BY Munday Clark & Carpenter
ATTORNEY

June 11, 1929. W. E. TAYLOR 1,716,671
AGITATED SOLDER BATH
Filed March 17, 1926 3 Sheets-Sheet 2

June 11, 1929.  W. E. TAYLOR  1,716,671
AGITATED SOLDER BATH
Filed March 17, 1926  3 Sheets-Sheet 3

INVENTOR.
William E. Taylor
BY Munday, Clarke & Carpenter
ATTORNEY

Patented June 11, 1929.

1,716,671

UNITED STATES PATENT OFFICE.

WILLIAM E. TAYLOR, OF EAST ORANGE, NEW JERSEY, ASSIGNOR TO AMERICAN CAN COMPANY, OF NEW YORK, N. Y., A CORPORATION OF NEW JERSEY.

AGITATED SOLDER BATH.

Application filed March 17, 1926. Serial No. 95,234.

My invention relates to an improved means and method of providing uniform temperature in a solder bath used for automatically soldering the seams of metallic containers or similar articles.

In the can making art the soldering of the side seam of a cylindrical or other annular shaped metallic container has long been accomplished automatically by passing the said container lengthwise over a soldering roller rotating within a bath of molten solder. As the contained body is moved along the longitudinal length of the roller, the latter is rotated, and this action carries a given amount of solder from the bath and deposits it in the side seam of the container. Such a soldering apparatus is fully disclosed in the pending Murch application, Serial No. 43,067, filed July 13, 1925, and my invention relates to an improvement upon the soldering apparatus disclosed in that application.

For many purposes, it is highly desirable to maintain a uniform temperature in the solder bath, the resulting soldered side seam of the container depending in large part upon the proper amount of solder and the proper temperature of the same as it is applied to the seam. Inasmuch as the molten solder must of necessity be heated by some heating element, it has been found almost impractical to so dispose the heating elements as to insure a uniform temperature in the bath. The ordinary method of heating a solder bath is by a gas flame placed under the bath, and it has been found in practice that the molten soldier being of such a heavy consistency, is affected slowly by heat convection and that accordingly the area immediately above the burners is at a temperature higher than the spaces between the burners.

Furthermore it will be apparent that in the soldering of can bodies as the can forms are fed along the guideway and into contact with the soldering rolls a great deal of the heat of the bath is taken away at the entrance end of the solder bath. In other words, the discharge end of the bath is a great deal hotter than the entrance end, and this is because of the taking away of the heat by the cold can bodies being brought into contact with the solder roll.

Under modern can manufacturing methods, the regulation of the heat in the heating elements is controlled automatically by a thermopile. The connection from the thermopile to the molten solder is usually made by placing one end of the electrical detector of the thermopile at one given point in the solder bath. Inasmuch as the temperature throughout the bath varies, it is evident that the temperature recorded at this one point is not representative of the temperature in the entire bath.

Numerous other objects and advantages of the invention will be apparent as it is better understood from the following description, which, taken in connection with the accompanying drawings, discloses a preferred embodiment thereof.

My invention relates to a simple device by which the molten solder in the solder bath is slowly circulated in order to distribute the heat units throughout the entire mass of the metal of the bath. Reference should be had to the drawings, wherein.

In the description that follows, the same numeral designates the same parts throughout the various views in the drawing, and reference should be had thereto.

Figure 1:
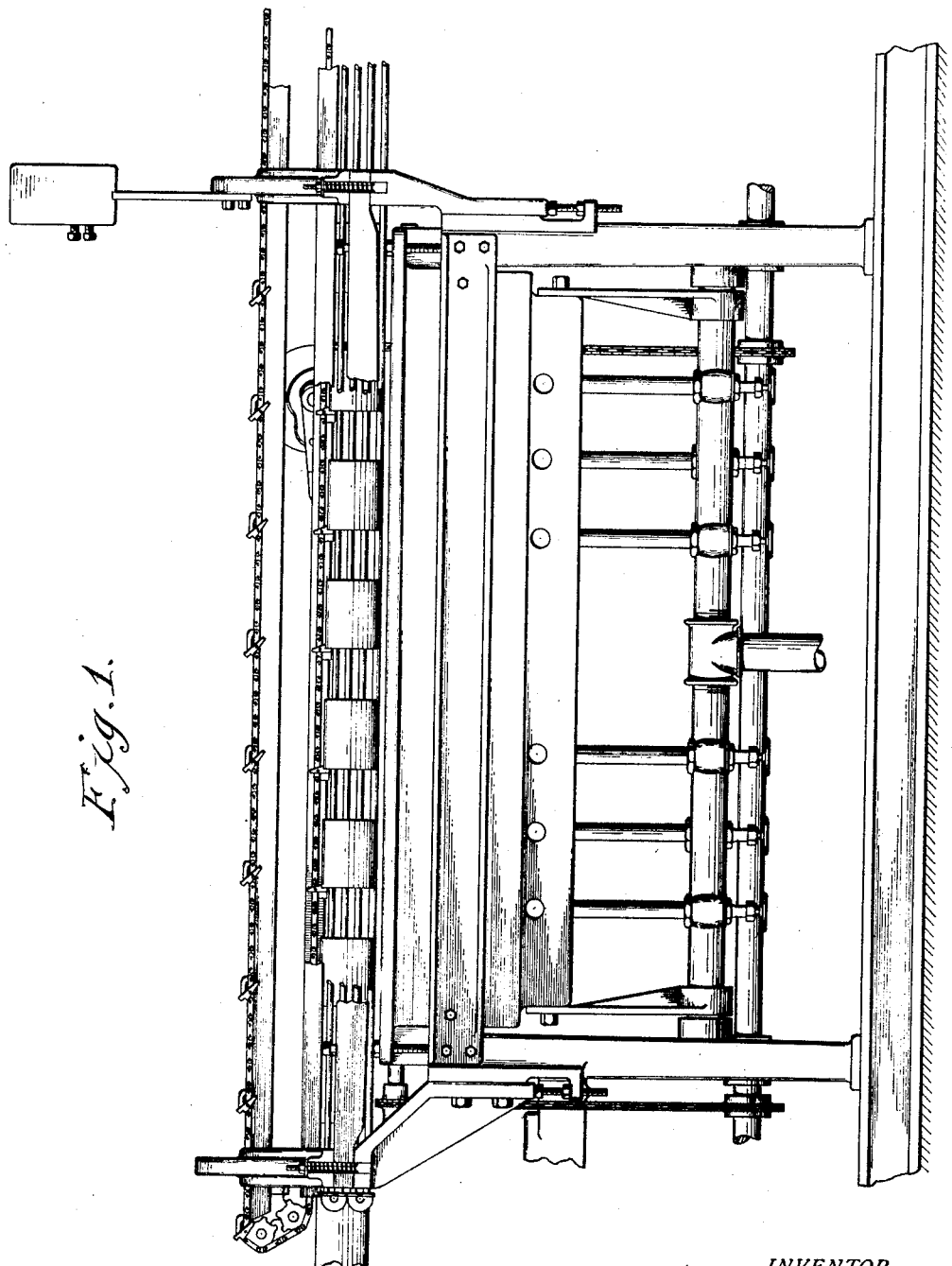
Fig. 1 illustrates a side elevation of a soldering bath, the parts being broken away for clearer illustration.

The solder bath 11 is mounted within a frame 12 supported by legs 13. The solder machine disclosed in Fig. 1 may be attached to the ordinary can making machine indicated roughly at 14. A forming mandrel of the said body forming machine is designated at 15 and is in axial alignment with longitudinal guideways 16 through which the formed containers 17 are moved longitudinally by means of a conveyor chain 18 provided with catches 19 and passing on one end over idler sprockets 20. The said conveyor chain 18 is supported upon and within suitable guides 21 mounted on brackets 22 connected to the frame 12 of the soldering device. Inflammable gas is supplied through a manifold 23 leading to burners 24 placed beneath the solder bath 11.

Figure 2:
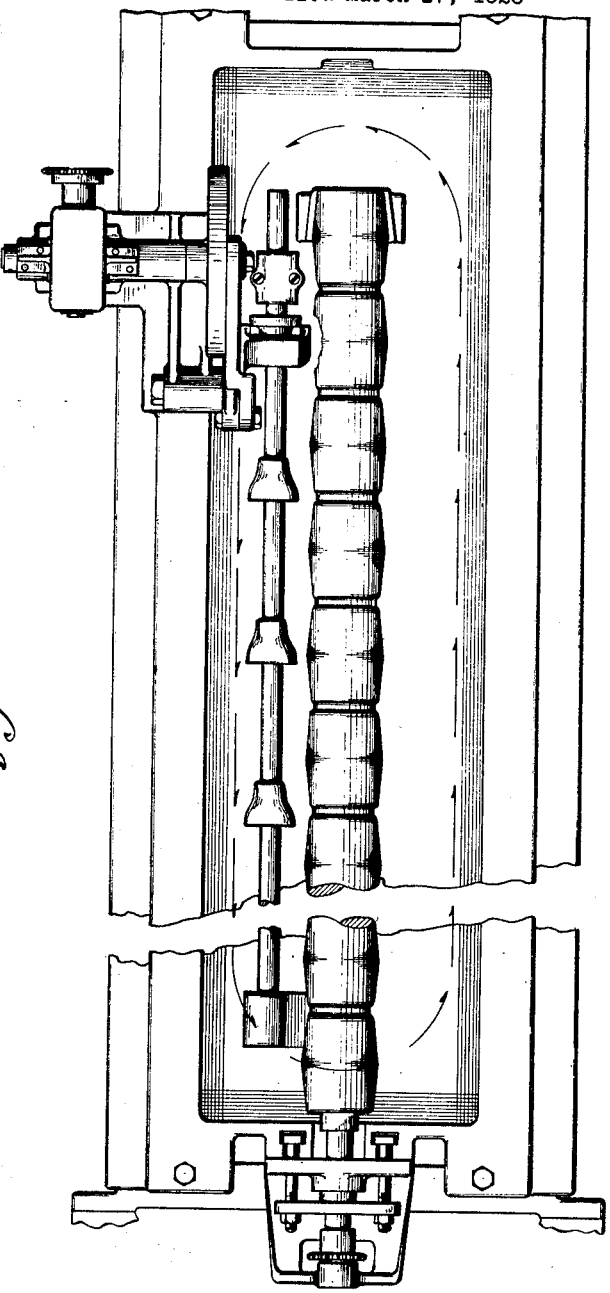
Fig. 2 is a plan view of the solder bath, the solder roll and the agitating mechanism.

As the formed containers 17 are moved longitudinally along the length of the guides 16, the lower edge of the container passes above a solder roll 25—see Fig. 2. The said solder roll 25 rotates within the bath 11 and is partially submerged by the molten solder contained in the said bath. The said solder roll is supported at one end on a bracket 26 and is carried by a shaft 27 upon its opposite end, which passes through a stuffing box 28 extending through the end wall of the bath 11. The said shaft 27 carries a sprocket 29 externally disposed to the bath, and supported by a bracket 30 extending from the frame 12. A sprocket chain 31 communicates rotation to the shaft 27 through the sprocket 29 by means of a sprocket 32 secured to a driveshaft 33 journaled at 34 in the legs 13. This drive-shaft can be suitably rotated in any manner, not shown, and is preferably an extension of the drive-shaft relating to the can making machine.

Figure 3:
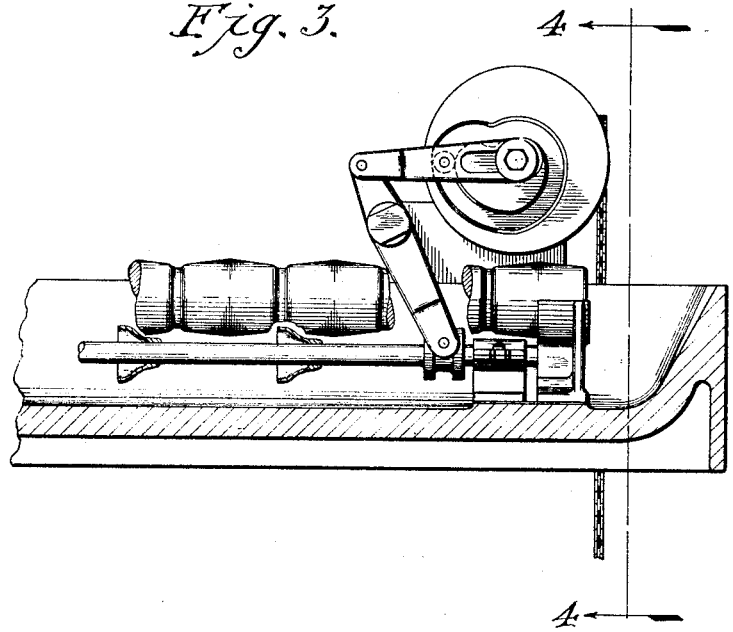
Fig. 3 is a cross-sectional elevation of parts of the discharge end of the solder bath, illustrating a portion of the solder roll and a portion of the agitating elements, the parts being broken away at various planes to more clearly disclose the invention.
Figure 4:
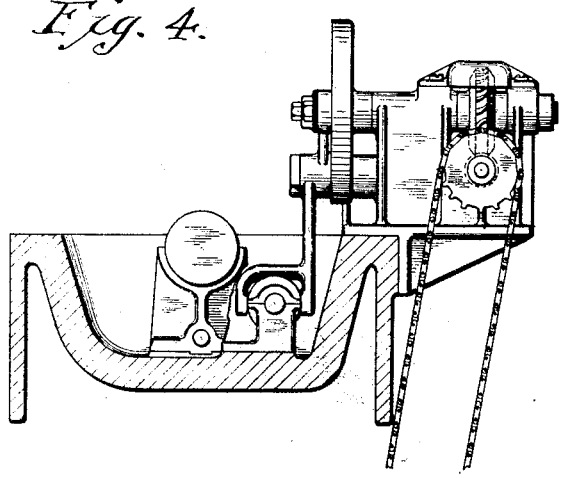
Fig. 4 is a transverse sectional view of a solder bath provided with the agitating device, the view being taken substantially along the line 4—4 of Fig. 3.

My improved agitating or stirring device consists primarily of a shaft 35 sliding in suitable bearings 36 mounted in the solder bath 11. Cup members 37 are disposed at regular intervals upon the said shaft 35 and the contour of the same is such as to form a pocket 38 on the inside of the cup, upon one face thereof, and to form a gently rounded surface upon the opposite face of the cup. The shaft and cups 37 are slowly moved back and forth in the molten solder which, owing to its heavy character, offers resistance to the movement of the cups. As the shaft and cups are moved toward the left as viewed in Figs. 2 and 3, the chamber 38 catches a mass of the solder and causes it and the surrounding portion to move with it. As the shaft and cups are moved toward the right upon their return stroke, less resistance is offered by the cups against the solder and little or no movement of the same takes place. By this method I obtain a complete circulation of the mass of solder with the bath, this taking the form of the path illustrated by the arrows in Fig. 2.

Reciprocation of the shaft 35 is obtained by the following mechanism; a grooved collar 39 is secured to the shaft 35 adjacent one end and this collar is loosely connected by pins 40 to a lever 41 pivoted at 42 to a bracket 43 mounted upon one edge of the frame of the solder bath 11. The opposite end of the said lever 41 is connected at 44 to a sliding lever 45 slotted at 46 to move along a shaft 47 carrying a cam 48 provided with a cam groove 49 in which operates a cam following roller 50, secured at 51 to the lever 45. By this construction, rotation of the cam 48 causes the lever 45 to move back and forth and to oscillate the lever 44, which in turn communicates sliding motion to the shaft 35—see Fig. 3. The cam 48 is rotated by rotation of the shaft 47 which carries a worm gear 52 communicating with a worm 53 mounted on a short stub shaft 54 journaled in the bracket 43. The shaft 54 carries a sprocket 55 over which a sprocket chain 56 passes from a similar sprocket 57 mounted on the drive shaft 33. By this mechanism rotation of the drive shaft is communicated to the cam and this rotary movement is translated into the reciprocating movement upon the shaft 35 as described.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of uniformly heating the solder of a solder bath used for automatically soldering the side seam of a metallic container, comprising heating the solder of the bath and creating a circulation of the lower part of the body of solder longitudinally within the bath in directions parallel with the path followed by the container in receiving said solder.

2. The method of soldering can seams and the like, comprising rotating solder applying rolls into contact with solder contained in a solder bath, applying the solder on the rolls to the cans, and heating the solder of the solder bath while stirring said solder in a direction parallel with the applying roll and at a point near where the heat is applied to effect a uniform temperature thereof.

3. In a device of the class described, the combination of a solder bath adapted to contain solder, solder rolls disposed with their surface normally immersed in said solder, means for rotating said solder rolls for applying the solder to can seams, means for heating the solder in the bath and means for causing a circulation of the solder within the bath.

4. In a solder bath for soldering the side seams of cans and the like, the combination of a bath adapted to contain a quantity of solder, soldering rolls immersed therein, means for heating the solder and movable means immersed in said solder for causing a circulation of the solder in the bath.

5. In a device of the class described, the combination of a solder bath adapted to contain a quantity of solder, means for heating the solder and solder circulating means submerged in said solder and devices for moving said circulating means in substantially horizontal directions.

6. In a device of the class described, the combination of a solder bath adapted to contain a quantity of solder, means for heating the solder within the bath, a shiftable member mounted within the bath and provided with solder impelling members and means for actuating said shiftable member to cause a circulation of the solder in the bath.

7. In a device of the class described, the combination of a solder bath adapted to contain a quantity of solder, means for heating the solder within the bath, a shaft mounted on the bottom of the solder bath, a plurality of cup shaped members mounted on said shaft and means for reciprocating said shaft to cause said members to move slowly through the solder and to cause the solder to be circulated in a closed path throughout the bath.

8. In a device of the class described, the combination of a solder bath adapted to contain a quantity of solder, means for heating the solder within the bath, a mounting on the bottom of the bath, a shaft reciprocally mounted in said mounting, a plurality of solder impelling elements on said shaft longitudinally thereof, a cam, means for operating said cam and a link connection from said cam to said shaft for reciprocating said shaft endwise to cause a circulation of said solder within the bath.

9. The method of maintaining the desired heat and fluidity in the top portion of a solder bath from which solder is taken for soldering cans and the like, which consists in propelling the highly heated solder in the lower part of the bath in substantially horizontal directions under said top portion and thereby increasing the heat in said top portion.

WILLIAM E. TAYLOR.